United States Patent [19]

Baity, Jr. et al.

[11] Patent Number: 4,755,345

[45] Date of Patent: Jul. 5, 1988

[54] IMPEDANCE MATCHED, HIGH-POWER, RF ANTENNA FOR ION CYCLOTRON RESONANCE HEATING OF A PLASMA

[75] Inventors: Frederick W. Baity, Jr.; Daniel J. Hoffman, both of Oak Ridge; Thomas L. Owens, Kingston, all of Tenn.

[73] Assignee: The United States of America as represented by the United States Department of Energy, Washington, D.C.

[21] Appl. No.: 891,833

[22] Filed: Aug. 1, 1986

[51] Int. Cl.[4] .............................................. G21B 1/00
[52] U.S. Cl. .............................. 376/123; 333/99 PL; 333/33; 343/745; 343/861; 343/862
[58] Field of Search ....................... 376/123, 131, 132; 333/99 PL, 33; 343/745, 852, 861, 862

[56] References Cited

U.S. PATENT DOCUMENTS

| | | | |
|---|---|---|---|
| 2,810,070 | 10/1957 | Yates | 343/745 |
| 3,508,272 | 4/1970 | Khan et al. | 343/745 |
| 3,689,928 | 9/1972 | Felsenheld | 343/745 |
| 3,825,864 | 7/1974 | Ramstro | 343/745 |
| 3,909,830 | 9/1975 | Campbell | 343/745 |
| 4,080,604 | 3/1978 | Wosniewski | 343/745 |
| 4,571,595 | 2/1986 | Phillips et al. | 343/745 |
| 4,642,650 | 2/1987 | Morton | 343/745 |

OTHER PUBLICATIONS

Elet et al., "ICRF Antenna Coupling Studies," GA-A16848, Aug. 1982.
Perkins et al., A Resonant Cavity ICRF Coupler for Large Tokamaks" PPPL-2000, Apr. 1983.
Hwang et al., "Modeling of ICRF Heating of a Tokamak Plasma," PPPL-1990, May 1983.

Primary Examiner—Deborah L. Kyle
Assistant Examiner—Richard L. Klein
Attorney, Agent, or Firm—David E. Breeden; Stephen D. Hamel; Judson R. Hightower

[57] ABSTRACT

A resonant double loop radio frequency (rf) antenna for radiating high-power rf energy into a magnetically confined plasma. An inductive element in the form of a large current strap, forming the radiating element, is connected between two variable capacitors to form a resonant circuit. A real input impedance results from tapping into the resonant circuit along the inductive element, generally near the midpoint thereof. The impedance can be matched to the source impedance by adjusting the separate capacitors for a given tap arrangement or by keeping the two capacitances fixed and adjustng the tap position. This results in a substantial reduction in the voltage and current in the transmission system to the antenna compared to unmatched antennas. Because the complete circuit loop consisting of the two capacitors and the inductive element is resonant, current flows in the same direction along the entire length of the radiating element and is approximately equal in each branch of the circuit. Unidirectional current flow permits excitation of low order poloidal modes which penetrate more deeply into the plasma.

7 Claims, 4 Drawing Sheets

IMPEDANCE MATCHED, HIGH-POWER, RF ANTENNA FOR ION CYCLOTRON RESONANCE HEATING OF A PLASMA

BACKGROUND OF THE INVENTION

This invention, which is a result of a contract with the United States Department of Energy, relates generally to high-frequency, high-power antennas and more specifically to improvements in high-frequency, high power, inductive loop antennas of compact design.

Radio frequency (rf) heating in the 10 to 100 megahertz (MHz) range is a practical and efficient means of heating magnetically confined plasmas to high temperatures for fusion energy devices. The high-frequency waves are generated in an oscillator outside a vacuum vessel containing the magnetically confined plasma. If the waves have particular frequencies (or wavelengths), part of their energy can be transferred to the nuclei or electrons in the plasma. These particles then collide with other particles and thereby increase the plasma temperature.

In ion cyclotron resonance heating (ICRH), the frequency of the energy source is adjusted to be roughly equal to the frequency at which the ions in the plasma spiral about the magnetic field lines. The ions acquire energy from the rf waves and share it with other particles in the plasma by collisions. ICRH is generally preferred over electron cyclotron resonance heating because the frequency for a given magnetic field strength is lower due to the larger mass of the ions.

As the heating demands of medium and large fusion devices, such as the Tore Supra tokamak in France, for example increases, greater power handling demands over longer periods of operation are placed on the antenna systems used in rf heating of the plasmas in these devices. Due to limited access ports to the plasma, smaller antenna structures with higher power and higher frequency capabilities are required to maximize the power conveyed through each antenna. Such demands are forcing each component of the ICRH system antenna, Faraday shield, and rf vacuum feedthrough to be improved. An improved vacuum feedthrough for ICRH heating is the subject of a copending U.S. Pat. Application Ser. No. 836,776, now U.S. Pat. No. 4,694,264, filed Mar. 5, 1986, by Thomas L. Owens et al, for Improved Coaxial Vacuum Feedthrough and having a common assignee with the present invention. The subject matter of this reference is incorporated herein by reference thereto.

Various inductively coupled, antenna designs, such as the short loop, long loop, resonant cavity and U-slot antennas have been proposed, or used, for fusion plasma heating. However, the first three of these antenna designs have disadvantages, stemming from the requirement of external impedance matching networks which limit their usefulness. The U-slot has internal matching but is limited in load range that can be matched at high frequencies. For example, the simple half-loop antenna has been used on many plasma confinement experiments. This antenna design, although it offers good magnetic coupling to a plasma, has additional disadvantages due to its high voltage requirements at the input because of its high inductance, its high voltage standing wave ratio (VSWR) in the vacuum coax/feedthrough region between the antenna and the required matching network, usually stub tuners, and its need for multiple-port access for installation and removal in a typical use.

The resonant cavity configuration includes an inductive post radiating element which is coupled to ground at one end through a capacitor and fed by a coaxial line attached a fractional distance from the grounded end. By proper choice of the feedpoint and capacitance, this antenna can be matched to the transmission line for a single value of load resistance. However, since the load resistance due to the plasma may vary significantly, the antenna requires a matching network external to the vacuum system, as is the case with other antenna designs.

Thus, it will be apparent to those skilled in the art that there is a need for an improved inductive type antenna for high power and high frequency rf plasma heating applications which is of compact design, does not require external tuning networks, and provides reduced voltage and current requirements at the vaccuum feedthrough.

SUMMARY OF THE INVENTION

In view of the above need, it is an object of this invention to provide an improved compact, inductive-loop type antenna for use in rf frequency inductive heating of a magnetically confined plasma which does not require an external impedance matching network for varying plasma loads.

Another object of this invention is to provide an antenna as in the above object which requires lower voltages and currents in the coaxial feed line to the antenna for higher power and frequency applications.

Other objects and many of the attendant advantages of the present invention will be apparent from the following detailed description of the invention taken in conjunction with the drawings.

In summary, the invention is a resonant double-loop antenna for inductively coupling rf energy into a magnetically confined plasma within a vacuum housing. Basically, a resonant circuit is formed by connecting an inductive radiating element between capacitors C1 and C2 which have their opposite electrodes connected in common. The inductive element is in the form of a current strap positioned adjacent the plasma to be heated. The length of the inductor is much less than a half wavelength of the operating frequency range, typically 50 to 110 megahertz. A real input impedance is obtained by tapping into the resonant circuit at a near midpoint of the current strap between capacitors C1 and C2. The impedance can be matched by adjusting capacitors C1 and C2 for a given tap arrangement, or by keeping C1 and C2 fixed and adjusting the tap position. Because the complete circuit loop consisting of C1, C2, and the antenna inductor or current strap is resonant, current flows in the same direction along the entire length of the antenna and is essentially equal in each branch of the circuit divided by the input tapping point. This reduces the voltage and current requirements at the input of the antenna. An electrostatic shield (Faraday shield) may be placed between the inductive radiating element and the plasma being heated to prevent capacitive coupling between the plasma and the antenna.

DETAILED DESCRIPTION

Figure 1:
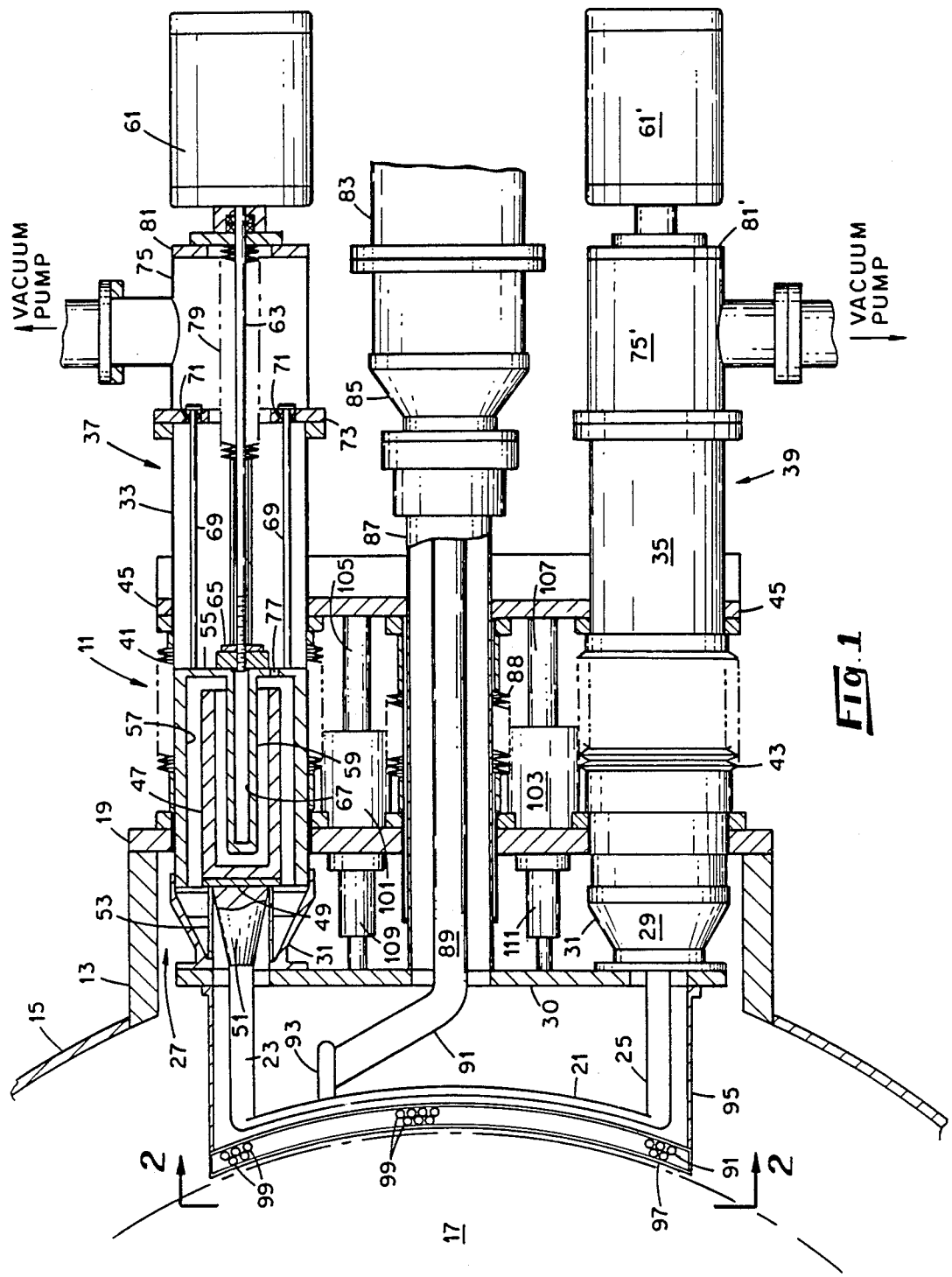
FIG. 1 is a cross-sectional view of a resonant double loop antenna system according to the present invention disposed in an access port of the vaccuum vessel of a magnetically confined plasma fusion device.
Figure 2:
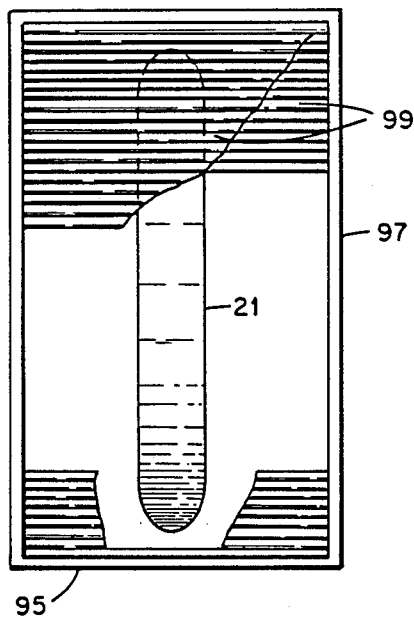
FIG. 2 is a view taken along lines 2—2 of FIG. 1 and partially cut away to reveal the antenna radiating element.

Referring now to FIGS. 1 and 2, a resonant double loop antenna system 11, made in accordance with present invention, is shown in an illustrative embodiment adapted to be mounted in a rectangular access port flange 13 of a vacuum containment vessel 15 for inductively radiating energy into a plasma 17 which is magnetically confined within the vacuum vessel 15. The antenna system is supported by a mounting plate 19 which is sealably mounted to a vacuum port flange 13 of the vacuum vessel 15 to form a vacuum tight seal in a conventional manner, as by bolting with appropriate vacuum seals (not shown) between the flange 13 and the plate 19. The entire antenna assembly 11 is supported by the mounting plate 19.

The radiating element of the antenna is in the form of an inductive current strap which is formed of a rectangular cross-section strainless steel bar 21 with a copper coating. The bar 21 is formed at the ends to provide a smooth transition for a welded connection to cylindrical support posts 23 and 25 which extend through openings in a forward support plate 30 and are welded to the inner conductor of coaxial vacuum feedthroughs 27 and 29, respectively. The feedthroughs 27 and 29 are identical and only one (27) is shown in detail. These feedthroughs are similar in construction to that described in the above referenced application. The outer conductor 31 of each feedthrough is sealably welded at one end to the back face of the support plate 30 in alignment about the openings through which the corresponding support posts 23 and 25 extend. The opposite ends are connected to the outer cylindrical housings 33 and 35 of separate motor-operated adjustable capacitors 37 and 39. The capacitor assemblies 37 and 39 are slidably disposed in corresponding openings in the mounting plate 19 and vacuum sealing is provided by metal bellows 41 and 43 disposed about the housings 33 and 35, respectively, of the capacitor assemblies. One end of the bellows is sealably welded to the outside of the mounting plate 19 while the other end is sealably welded to a movable back plate 45. The capacitor housings are sealably welded to the back plate 45 about openings in the plate 45 through which the capacitor housings 33 and 35 extend. This arrangement forms a vacuum tight seal about the capacitor assemblies 37 and 39 between the vacuum atmosphere of the interior of the vacuum vessel 15 and atmospheric pressure outside the vessel.

Each of the motor-operated adjustable capacitors 37 and 39 are identical and of a custom design for the embodiment shown in FIG. 1. Various other motor-operated capacitors may be used such as the capacitor Model No. CWV2450 supplied by the Jennings Company, San Jose, Calif. These capacitors are vacuum capacitors which are variable over the range of from about 50 to 1000 picofarads. As shown in detail by the cross-sectional view of capacitor 37, the capacitor includes one fixed position electrode formed of an electrically conductive metal cylinder 47 having a closed end portion 49 which is electrically connected to the inner conductor 51 of the corresponding vacuum feedthrough 27. The feedthrough has a ceramic cylinder 53 which is sealably attached by brazing between the outer grounded conductor 31 and the inner conductor 51. The ceramic cylinder provides a vacuum tight seal for the connection between the antenna support post and the corresponding capacitors. The inner conductor 51 is in the form of a truncated cone having its large diameter base portion electrically connected to the fixed electrode end portion 49 of the capacitor 37. The tapered inner conductor 51 provides both impedance matching for the feedthrough connector and an increased surface area for connections to the corresponding capacitor fixed electrode 47.

The movable electrode 55 is formed of a larger cylinder 57 which is slidably disposed within the housing 33 of the capacitor assembly coaxially about and spaced from the outer walls of the fixed electrode 47. The movable electrode 55 also has a central, axially disposed post portion 59 which fits within and spaced from the inner walls of the fixed electrode 47 with a corresponding spaced relationship to that of the outer cylinder. This arrangement provides the required surface area for the appropriate capacitors range of values. The capacitance is varied by moving the electrode 55 through a motor drive arrangement of a reversible electric motor 61. The motor 61 rotates a shaft 63 which threadably engages a drive nut 65 attached to a closed end of the electrode cylinder 57. As the shaft 63 rotates to slide the movable electrode 55 from the fully extended position, as shown in FIG. 1, the rod extends into a blind bore 67 in the center of the post 59. Guide rods 69, attached at one end to the closed end of the capacitor electrode 55, move through corresponding slide bearings 71 in an outer end flange 73 of the capacitor housing as the electrode 55 moves. The flange 73 has an enlarged central opening through which the drive rod 63 passes.

A vacuum coupling 75 is attached to the flange 73 which provides connection between a vacuum pump (not shown) and the interior of the capacitor housing 33 through the central opening in flange 73 about this shaft 63. Openings 77 are provided in the base of electrode 55 to provide sufficient fluid communication for applying vacuum to areas between the electrodes 55 and 47. In order to seal the motor drive shaft 63 and provide movement of the electrode 55, a bellows 79 is provided which is disposed about the shaft 63 and sealably connected at one end to the drive nut 65 and at the other end to an outer flange 81 of the vacuum coupling 75, through which the shaft 63 extends from the drive motor 61 attached to the flange 81. The capacitors are operated at a vacuum of about $10^{-6}$ Torr.

The antenna is fed by a 50 ohm coaxial line 83 connected through a matched impedance vacuum feedthrough coupling 85 and a coaxial feed line having a grounded outer conductor 87 which slidably passes through a central opening in the mounting plate 19. The feed line is sealably connected at one end to the outer conductor of the feed-through 85 and to the movable back plate 45 where it passes through an opening therein by weldings at these points.

A bellows 88 is disposed about the outer conductor 87 and sealably connected between the mounting plate 19 and the movable back plate 45 to provide a vacuum seal about the feed line. Details of the vacuum feedthrough, which isolates the vacuum environment of the vessel 15 at the coaxial coupling, may be had by referring to the above referenced patent application.

The opposite end of the coaxial feedline housing 87 is connected to the forward support plate 30, which has a central opening aligned therewith through which the center conductor 89 of the feed line passes. The center conductor is connected to a circular cross-section connector arm 91 which is welded to a transition coupling 93 which is, in turn, welded to the back side of the inductive current strap 21 at the selected feed point for the particular antenna application, as will be described herein below.

The antenna radiating element, or current strap 21, is shielded by means of a Faraday shield 95 which provides an electrostatic shield between the plasma 17 and the antenna element 21 to prevent capacitive coupling therebetween. The shield 95 is a generally rectangular enclosure mounted to the forward support plate 30. It has a curved front protion 97 which is contoured to match the plasma outer profile at the antenna location due to the fact that the antenna radiating element 21 may be placed in relatively close proximity to the confined plasma 17. Thus, the element 21 is also curved to match the plasma profile and provide constant displacement from the edge of the plasma 17 along the radiating span of the antenna radiating element 21.

The curved front 97 of the shield 95 is formed of a plurality of spaced-apart electrically-conductive cylindrical bars 99 which extend across the front curved opening of the shield 95, as shown in FIG. 2. The bars are arranged along two separate radii of curvature and staggered in location to maintain electrostatic shielding of the antenna while maintaining sufficient open spacing to allow inductive coupling of radiant energy into the plasma in a conventional manner.

The entire antenna assembly 11 is slidably mounted through the mounting flange 19 and a positioning means is provided to position the antenna relative to the plasma 17. Various positioning means may be used to position the antenna, such as electromechanical or pneumatic drives. A pneumatic arrangement is illustrated in FIG. 1 which includes a pair of reversible piston and cylinder drives 101 and 103 with rods 105 and 107, attached between the corresponding pistons and the movable plate 45. By moving the plate 45, the whole assembly may be moved in or out relative to the mounting plate 19. The positioning device may be remotely operated through pneumatic lines (now shown) attached to the cylinders in a conventional manner.

Further support is provided by slidable support guides 109 and 111 connected between the mounting plate 19 and the front support plate 30. These guides provide support for the front portion of the antenna assembly within the vacuum housing while allowing movement of the front support plate 30 relative to the mounting plate 19 during positioning of the antenna relative to the plasma 17.

Figure 3:
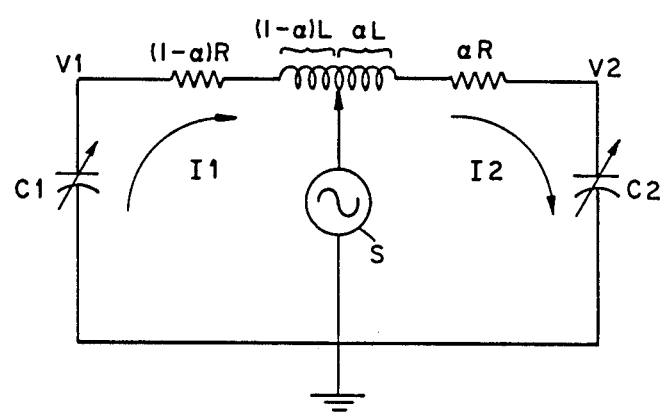
FIG. 3 is an equivalent circuit schematic for the antenna system shown in FIG. 1.

Once the antenna is positioned relative to the plasma, the capacitance of the variable capacitors 37 and 39 is adjusted by means of remotely operating the reversible motors 61 and 61' to match the impedance of the antenna at the feed point to the feed line impedance (typically 50 ohms) for a particular operating frequency and power coupling (load). The adjustment procedure may be best described by referring to the schematic circuit representation of the resonant double loop antenna shown in FIG. 3 for a grounded capacitor configuration as described in FIG. 1. The resonant circuit is formed by the combination of C1, C2 (capacitors 37 and 39 in FIG. 1), and the antenna element 21 having an inductance (L). The antenna length is assumed to be $<<\lambda/2$, where $\lambda$ is the operating frequency wavelength. A real input impedance, meaning that the input voltage and current have the same phase, results from tapping into the resonant circuit, as shown in FIG. 1. The impedance can be matched to the source S impedance by adjusting the capacitors C1 and C2 for a given tap arrangement, as shown in FIG. 1, for example, while maintaining resonance. Although the feed tap may be positioned at the center of the radiating element 21, an option feed point for a particular arrangement may be determined which is normally off-center as shown in FIG. 1, as will be described herein below. Alternatively, the impedance may be matched to the source by keeping C1 and C2 fixed and adjusting the tap position. An embodiment of this type would require a positionable current tap arrangement on the back of the current strap 21 with an appropriate positioning drive means. This configuration would be more difficult to achieve in practice, especially with the limited vacuum vessel access space of present plasma confinement devices.

Since the complete circuit loop consisting of C1, C2, and the antenna inductor is resonant, current flows in the same direction along the entire length of the antenna and is approximately equal in each branch of the circuit (I1≃I2) divided by the feed tap. Unidirectional current flow permits excitation of low order poloidal modes in the plasma which penetrate more deeply into the plasma. The circuit equations which govern the grounded capacitor configuration shown in FIG. 3 can be written as follows:

$$X_1^2 + X_1 f(X_2) + R_1^2 = 0, \quad (1)$$
$$X_2^2 + X_2 h(X_1) + p(X_1) = 0; \quad (2)$$

where $X_1$ and $X_2$ are the reactances of the two branches of the circuit at the feedpoint and $$f(X_2) = X_2 + \frac{R_2^2}{X_2}, \; h(X_1) = -\frac{2Z_o X_1}{R_1 - Z_o}, \quad (3)$$

$$p(X_1) = \frac{|R_1^2 R_2 + R_2^2 R_1 + R_2 X_1^2 - Z_o(R_1 + R_2)^2 - Z_o X_1^2|}{(R_1 - Z_o)}$$

In the above equations, $R_1 = (1-\alpha)R$, $R_2 = \alpha R$, $Z_0$ is the input impedance (typcially 50 ohms), and the parameter a dictates the position of the feedpoint ($\alpha = 0.5$ is a center tapped position).

Figure 4:
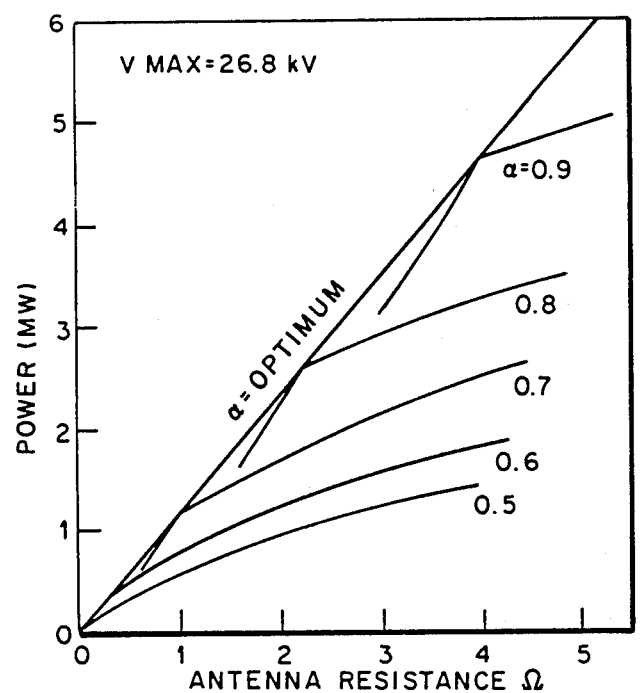
FIG. 4 is a plot of maximum power achievable in megawatts (MW) with the antenna configuration of FIG. 3 for typical antenna parameters of voltage (26.8 KV), frequency (55 MHz), inductance (0.1 microhenrys), and input impedance=Zo (50 ohms).

Referring now to FIG. 4, there is shown a plot of the maximum power achievable with this configuration for typical antenna parameters (frequency=55 MHz, L=0.1 microhenry and $Z_0$=50 ohms) versus antenna total equivalent series resistance. This plot assumes a maximum allowable voltage on the structure to be 26.8 kilovolts. This plot illustrates the power handling capabilities which is dependent on the choice of the feedpoint $\alpha$, which increases as $\alpha$ increases, for various antenna total resistances. For example, power handling in excess of 2 M watts can be achieved for antenna resistance, or load, values above 2 ohms, which is a typical antenna load for present day fusion experiments. Antennas tapped near the center of the inductor are better suited for low resistance antennas while antennas tapped near one end of the inductor are better suited to high resistance antennas.

Figure 5A:
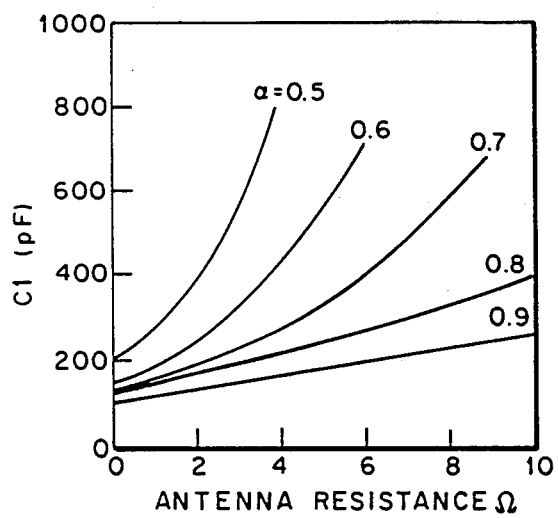
FIG. 5a and 5b is a plot of capacitance values C1 and C2, respectively, required to yield 50 ohm real input impedance for different antenna resistances and tap positions $\alpha$, with the same antenna parameters as in FIG. 4.
Figure 5B:
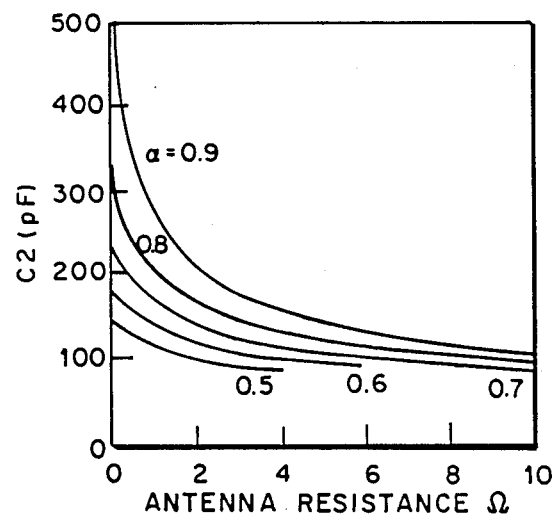

Tuning capacitor values which yield 50 ohm real input impedances are shown in FIGS. 5a and 5b for the various input tap positions. It is found from these figures that practical tuning capacitors exist for resistances up to about 4 ohms for the centrally tapped antennas, and more than 10 ohms for antennas tapped near one end.

Thus, an optimum tap point can be found by adding the constraint that voltages at each end of the inductive/resistive (current strap) portion of the circuit be equal and opposite ($V1 = -V2$). Mathematically, this adds a third equation to the set in Equations (1) and (2);

$$\frac{C1}{C2} = \left| \frac{R_2^2 + X_2^2}{R_1^2 + X_1^2} \right|^{\frac{1}{2}}.$$

Figure 6:
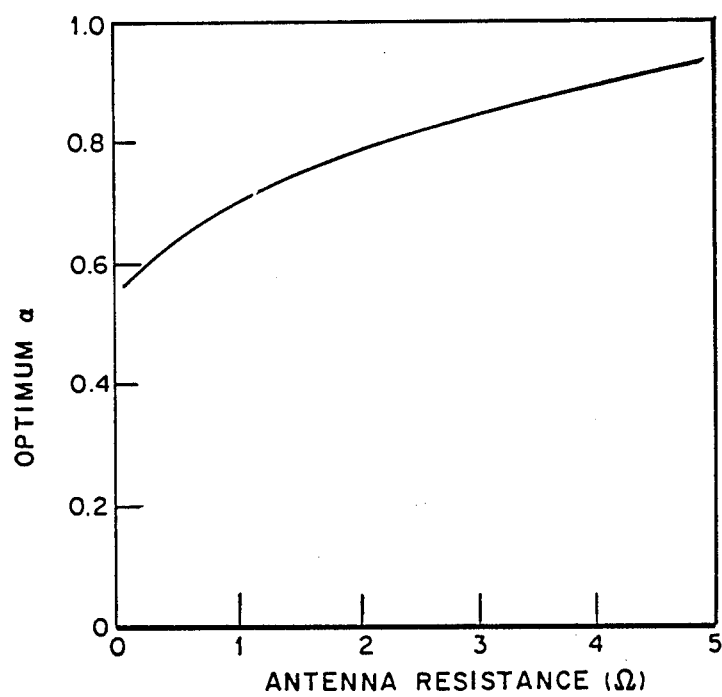
FIG. 6 is a plot of optimum feedpoint location $\alpha$ versus antenna resistance for the configuration shown in FIG. 3 with the same antenna parameters as in FIG. 4.
Figure 7:
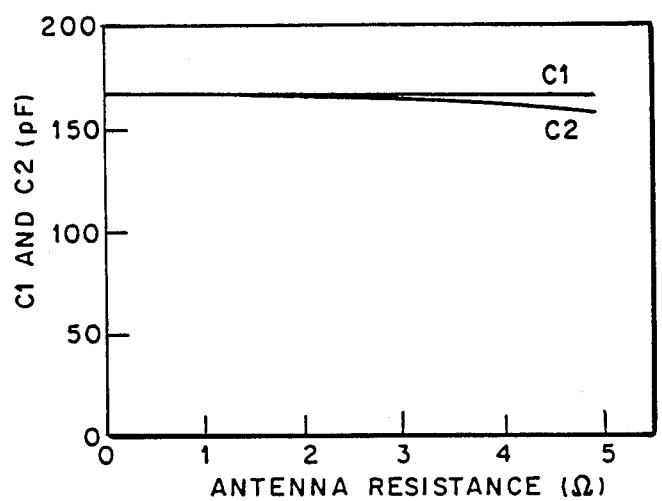
FIG. 7 is a plot of tuning capacitor values versus antenna resistance necessary to impedance match to a 50 ohm source when the feedpoint $\alpha$ is maintained at its optimum position (FIG. 6) and with the same antenna parameters as in FIG. 4.

Solutions to the full set of three equations yield the curve labeled "$\alpha$=optimum" in FIG. 4. In this optimum condition, power handling is maximum for a given antenna length. Values for the optimum $\alpha$ versus antenna resistance are given in FIG. 6. FIG. 7 is a plot of the tuning capacitor values that result as the tap point is maintained at the optimum position. Since the capacitor values remain nearly constant over a wide range of antenna resistance values, it will be seen that impedance matching and maximum power handling could be achieved using fixed capacitors and a variable feedpoint as mentioned above.

Thus, it will be seen that an antenna system has been provided for ion cyclotron resonant heating of a magnetically confined plasma which provides efficient magnetic field coupling of rf energy into the plasma over a wide range of plasma load impedance and operating frequencies. There is a strong interaction between plasma loading and the proximity of the current strap of the antenna to the plasma. Normally, antennas must be placed very close to the plasma (typically 2-10 cm) to obtain sufficient loading for significant power coupling. This means that the antenna is exposed to the severe plasma conditions. To minimize antenna damage, it is desirable to retract the antenna. However, since the rf fields (and therefore the impedance) are dramatically reduced by backing the antenna away from the plasma, the antenna must be able to cope with low plasma impedance and still operate effectively over a wide range of impedances. Due to the relatively low feedline currents and voltages required to maintain a higher current in the resonant double loop in this antenna, it is capable of maintaining the required power levels at low impedance loads.

Although the invention has been illustrated by means of a particular embodiment, it will be obvious to those skilled in the art that various modifications and changes may be made therein without departing from the spirit and scope of the following claims attached to and forming a part of this disclosure.

We claim:

1. An antenna for radiating rf energy into a magnetically confined plasma within a vacuum vessel, comprising:
    an inductive rf energy radiating element having a length substantially shorter than a half wavelength of the rf wavelength and disposed adjacent to said plasma;
    first and second variable capacitors connected respectively between opposite ends of said radiating element and a common connecting point;
    an input coaxial feedline having an outer conductor connected to said common connecting point of said first and second capacitors and an inner conductor connected to said radiating element at a fractional distance $\alpha$ of the length of said radiating element from one end of said radiating element to provide a real input impedance for said antenna which is matched to the input feedline impedance for feeding power to said antenna at a selected operating frequency in a manner to form first and second resonant loops having essentially equal currents $I_1$ and $I_2$, respectively, which flow in the same direction through said radiating element, wherein said current $I_1$ flows through said first capacitor and a length 1-$\alpha$ of said radiating element into said inner conductor of said feedline and said current $I_2$ flows out of said inner conductor of said feedline through a length $\alpha$ of said radiating element and said second capacitor;
    a drive means coupled to said first and second capacitors for varying the capacitances thereof so that the input impedance of said antenna may be varied to match the impedance of said coaxial feedline while maintaining resonance in said first and second resonant loops; and
    a vacuum sealed housing means for vacuum sealed mounting of said antenna in an access port of said vacuum vessel.

2. The antenna as set forth in claim 1 wherein said inner conductor of said feedline is connected to said radiating element at a fractional distance $\alpha \geq 0.5$ from one end of said radiating element to provide a real input impedance for said antenna which may be matched to the feedline impedance over the adjustable capacitance range of said first and second capacitors.

3. The antenna as set forth in claim 2 wherein the commonly connected electrodes of said first and second capacitors and the outer conductor of said coaxial feedline are connected to ground potential.

4. The antenna as set forth in claim 3 wherein said input coaxial feedline has a characteristic impedance of about 50 ohms said first and second capacitors are variable over a range of capacitance of from about 50 to 1000 picofarads and wherein $\alpha$ is selected in the range of from 0.5 to about 0.9.

5. The antenna as set forth in claim 4 wherein said selected operating frequency is in the range of from about 40 to 100 MHz at power levels greater than 2 MW.

6. The antenna as set forth in claim 5 further including means for adjustably positioning said antenna relative to said plasma.

7. The antenna as set forth in claim 6 further including an electrostatic shielding means disposed between said radiating element and said plasma to maximize magnetic field coupling of the radiated power from said radiating element into said plasma.

* * * * *